US007767901B2

(12) United States Patent
Contois et al.

(10) Patent No.: US 7,767,901 B2
(45) Date of Patent: Aug. 3, 2010

(54) CONTROL OF MUSICAL INSTRUMENT PLAYBACK FROM REMOTE MANAGEMENT STATION

(75) Inventors: David C. Contois, Essex Junction, VT (US); Daniel P. Contois, Essex Junction, VT (US)

(73) Assignee: Contois Music Technology, LLC, Essex Junction, VT (US)

( * ) Notice: Subject to any disclaimer, the term of this patent is extended or adjusted under 35 U.S.C. 154(b) by 0 days.

(21) Appl. No.: 11/379,048

(22) Filed: Apr. 17, 2006

(65) Prior Publication Data

US 2006/0230911 A1 Oct. 19, 2006

Related U.S. Application Data

(60) Provisional application No. 60/671,492, filed on Apr. 15, 2005.

(51) Int. Cl.
*G10H 7/00* (2006.01)
*G10H 1/36* (2006.01)
*H04B 3/00* (2006.01)

(52) U.S. Cl. .............................. 84/645; 84/610; 381/80

(58) Field of Classification Search ................... 84/645, 84/610; 381/80, 77
See application file for complete search history.

(56) References Cited

U.S. PATENT DOCUMENTS 5,864,868 A 1/1999 Contois
6,600,097 B2 7/2003 Shiiya
6,731,312 B2 5/2004 Robbin
6,737,571 B2 * 5/2004 Furukawa .................... 84/610
6,928,261 B2 8/2005 Hasegawa
2004/0055446 A1 * 3/2004 Robbin et al. ................. 84/615
2004/0224638 A1 11/2004 Fadell
2005/0071780 A1 3/2005 Muller
2005/0273790 A1 * 12/2005 Kearney et al. ............. 719/328

OTHER PUBLICATIONS

Yamaha Mark IV Brochure. Dec. 29, 2004. <http://www.yamaha.com/yamahavgn/CDA/ContentDetail/ModelSeriesDetail/0,,CNTID%25253D33874%252526CTID%25253D201700%2525-26CNTYP%25253DPRODUCT,00.html>.*

Yamaha DGC1M4 Features. Nov. 18, 2005. <http://web.archive.org/web/20051118164831/http://www.yamaha.com/yamahavgn/CDA/ContentDetail/ModelSeriesDetail/0,,CNTID=33874&CTID=201700,00.html>.*

"Yamaha Announces Disklavier Mark IV Pianos." Jan. 4, 2005. Electronic Musician. <http://emusician.com/emusician_xtra/Yamaha_Disklavier_Mark_IV_Pianos_010405/>.*

(Continued)

*Primary Examiner*—Jeffrey Donels
*Assistant Examiner*—Andrew R Millikin
(74) *Attorney, Agent, or Firm*—Sughrue Mion, PLLC

(57) ABSTRACT

A music playing system includes a computer and user interface to access a media database. A wireless base station device has a line out port providing two channel output. An automatic player piano has analog MIDI inputs, and a piano keyboard mechanism. The computer communicates wirelessly with the base station device, and the line out of the base station device outputs two channels which are connected to the analog MIDI inputs. A musical work, including related audio and MIDI data codes, is stored in the media database, with the different data codes in association with two different channels. The music data is sent via the wireless base station to the corresponding inputs of the piano. The piano sound system produces sound from the audio data codes and sends actuation signals to the keyboard mechanism, based on the MIDI codes.

12 Claims, 6 Drawing Sheets

OTHER PUBLICATIONS

"Yamaha Disklavier Mark IV World's Most Advanced Piano Player." May 2, 2005. Musician's News. <http://www.musiciansnews.com/ya/yamaha/yamaha_disklavier_mark_iv_world_s _ most_advanced_piano_player.shtml>.*

"Yamaha Strikes a Wi-Fi Chord." Dec. 2, 2004. Wi-Fi Planet. <http://www.wi-fiplanet.com/columns/article.php/3442981>.*

"Disklavier Mark IV Series." Jan. 21, 2005. Harmony Central. <http://namm.harmony-central.com/WNAMM05/Content/Yamaha/PR/Disklavier-Mark-IV.html>.*

"QRS Music—Press Release—New MIDI Controller." Feb. 9, 1999. QRS Music. <http://www.qrsmusic.com/press_details.asp?rid=22>.*

"QRS Music—Press Release—NetPiano Music Service." Dec. 29, 2003. QRS Music. <http://www.qrsmusic.com/press_details.asp?rid=60>.*

"QRS Music—Press Release—Qtouch-Tablet." May 20, 2005. QRS Music. <http://www.qrsmusic.com/press_details.asp?rid=79>.*

"QRS Pianomation MIDI Owner's Manual." Mar. 2, 1998. QRS Music. <http://www.qrsmusic.nl/download.php?id=759868,59,5>.*

"QRS Analog / MIDI Interface (AMI) Owner's Manual." Mar 2, 1998. QRS Music. <http://www.qrsmusic.com/downloads/pdf/om50060.pdf>.*

* cited by examiner

CONTROL OF MUSICAL INSTRUMENT PLAYBACK FROM REMOTE MANAGEMENT STATION

CROSS-REFERENCE TO RELATED APPLICATIONS

This application claims the benefit of U.S. Provisional Application No. 60/671,492, filed Apr. 15, 2005, which is incorporated by reference, herein, in its entirety.

FIELD OF THE INVENTION

The field of the invention is generally related to the control of a player piano using a remote computer or using a portable media playing device.

BACKGROUND AND RELATED ART

In U.S. Pat. No. 5,864,868 there is described a user interface for allowing a user access to media pieces stored in a media database, and for selecting media to be played on various devices, including on a player piano, an electric guitar, a computer system, a pipe organ, a television, a movie video player, or a computer screen. The interface is extremely user-friendly, allowing a user to select media for playing according to various criteria such as category, composer, and artist. The document explains, in one particular detailed embodiment, the manner in which such a user interface, if running on a computer connected to a MIDI type player piano, can be used to select media to be played on the player piano. The document describes in general the MIDI format and the now well understood issues of synchronizing the playing of the music and the movement of the keys on the player piano. This patent is incorporated herein by reference for its many useful background teachings including, in particular: all of the drawing figures; the description of the state of the art from col. 1, line 32 through col. 4, line 27; the overview of MIDI data codes in col. 6, line 47 through col. 7, line 13; the overview of player piano operation in col. 7, line 16 through col. 8, line 20; the description of the constituent parts of a computer-controlled piano player system in the particular embodiment found at col. 8, line 21 through col. 9, line 18; and the description of the user interface in col. 9, line 21 through col. 14, line 33.

In U.S. Pat. No. 6,600,097 there is a useful background description of a modern player piano system. The player piano system receives two kinds of input data. One kind of input data is audio data codes and another is MIDI data codes. This document explains that, when a compact disk is designed to reproduce a piece of music through a compact disc player, pieces of music data information to be stored in a compact disc are stored in a certain format. The certain format is referred to in the document as an audio data format. Accordingly, the data codes in the audio data format are referred to as audio data codes. On the other hand, when a compact disc is designed to reproduce a piece of music through an electronic keyboard, the pieces of music data information are, by way of example, stored in data codes formatted in accordance with the MIDI standard. The format defined in the MIDI standard is referred to as MIDI format, and the data codes in such a MIDI format are referred to as MIDI data codes. This document also provides useful background information on the different ways in which MIDI data can be used in connection with a player piano. Another point made by the document is that it is known in the art to produce a composite information storage medium that includes both the audio data codes and the MIDI data codes for a given piece of music. U.S. Pat. No. 6,600,097 is incorporated herein by reference for its many useful background teachings, including in particular: all of the drawing figures; the background information about modern player piano as appearing in column 1, beginning at line 17, and extending through column 2, line 42; the detailed description about electrical components found in a modern player piano in column 4, line 44, through column 7, line 32. Although this document explains about audio data codes and MIDI data codes, and mentions the compounds at information storage medium, most of the document relates to a situation in which the audio data codes and the MIDI data codes are supplied from two different sources.

The term, "analog MIDI" will be familiar to those interested in this field. As is well known, MIDI is a format that is similar in ways to a language. In particular, data in the MIDI format defines musical notes and attributes, but is not itself a recording of a musical performance. When MIDI data is converted to analog form using FSK or the like, the result may be referred to as "analog MIDI." Modern player pianos have MIDI inputs for reading files in the MIDI format, and also may often have analog MIDI inputs for receiving analog MIDI data. Older instruments lacking an analog MIDI input can be converted to include such an input or can be used with an adapter device that accepts analog MIDI input. Analog MIDI signals received through analog MIDI inputs are converted back to MIDI format and then handled as MIDI data. In the discussion below, it would be inconvenient to differentiate between MIDI data codes in MIDI format and MIDI data codes that have been converted to analog MIDI format, and which will in the future be converted back to MIDI format. Therefore, no differentiation will be made and it will be understood that the MIDI data codes are either in MIDI format (i.e., digital format) or in analog MIDI format (i.e., analog format), the particular format being apparent from the context.

In U.S. Pat. No. 6,928,261, there is a useful background description of a modern music data distribution system suitable for use with a modern player piano. This document recognizes that there are different data formats, and that a particular music playing device might need one particular data format, and might not be suitable for use with data in other formats. The music data distribution system requires the user to provide information as to what kind of device is being used, and then presents the user with music that can be downloaded and is in the correct format. The system tells the user when requested music is not available in a particular format. In certain embodiments, the document describes the conversion of music data from one data format to another data format. In the case of MIDI-enabled musical instruments, the system proposed in the document permits the user only to download music that is in the MIDI data format. More particularly, the downloaded MIDI data format music is downloaded to a user's computer, and apparently not directly into a musical instrument. This document is incorporated herein by reference for its useful background description of a musical distribution system for distributing music data in various data formats.

U.S. Pat. No. 6,731,312 and United States Patent Application Publication 2005/0071780 relate to a graphical user interface popularly known as APPLE ITUNES. Both of these documents are herein incorporated by reference for their background information on the interface, and also for the information relating to the APPLE ITUNES MUSIC STORE feature which permits users to browse selections and purchase musical works. In the former document, to be particular, all of the drawing figures are incorporated by reference as well as the description of the graphical user interface provided in column 2, line 1, through column 4, line 61. In the letter document, to be particular, all of the drawing figures are incorporated by reference as well as the description of the graphical user interface presented in paragraphs 42-137.

United States Patent Application Publication 2004/0055446 describes a portable multimedia device popularly known as an APPLE IPOD. This publication also describes a method and system for providing the user with a friendly and efficient retrieval of stored multimedia files, by way of a hierarchical user interface. This document is incorporated by reference for its useful background description of how a portable media player device works, how it can be manipulated, and its functionality. In particular, all of the drawing figures are incorporated by reference herein, as well as the background description in paragraphs 5-10, and the detailed description in paragraphs 18-33.

Portable media players, such as the APPLE iPod, and user interface software for allowing a user access to media pieces stored in a media database, such as APPLE's iTunes software, and online systems that make it easy to search for, select, and download various musical works, have become extremely popular. The Apple iPod, the Apple iTunes software, and the Apple music store have become so popular, in fact, that they are very nearly a standard for the management and commercial distribution of music works and other media types. The iTunes software and Apple Music Store, and like products, have become the standard means by which users manage their entire music and video collections. Consumers today are generally comfortable with the ability to purchase content such as music, videos and other media via the internet.

Today, more and more products are available to facilitate the simplified use and the distributed use of multimedia information. United States Patent Application Publication 2005/0273790 describes one such product popularly known as the APPLE AIRPORT EXPRESS. This document provides a detailed explanation of the manner in which a network media station such as the Apple Airport Express may be used to play multimedia content from a personal computer, e.g., audio files, on an entertainment device, e.g., a stereo system. This document illustrates the manner in which a personal computer communicates wirelessly with the networked media station so as to send to the networked media station audio data, and the manner in which the networked media station is connected with a stereo receiver so that the stereo receiver can play audio files such as music files. This document is herein incorporated by reference for its useful background information on the topics just mentioned. To be particular, all of the drawing figures are herein incorporated by reference (with the reader's attention being directed in particular to FIGS. 1, 3-6, 10, and 11. Moreover, the accompanying text in the document that corresponds to these figures is incorporated by reference. As well, paragraphs 22-60 are incorporated herein by reference.

Another product, not at this instant available commercially, is described in United States Patent Application Publication 2004/0224638. This document describes a wireless portable media player that may be summarized as a wireless Apple iPod. This document is incorporated herein by reference for its helpful background discussion of a wireless portable media player, and various ways in which such a player can be interfaced with other devices in a wireless manner. All of the drawing figures are incorporated by reference, as well as the description in paragraphs 41-118.

Although there is a lot of music and other multimedia available for download through distribution systems such as the iTunes music store, there is no music available which can be downloaded through the iTunes music store and used with a modern player piano such that the music contains both audio data codes and MIDI data codes. One reason for this may be the fact that iTunes does not support playback of MIDI files. The iTunes program could be used to attempt to "play" an analog MIDI format file as if it were an audio file with audio data codes, but the result would sound like the playback of a fax or a modem since the MIDI data codes in an analog MIDI format file are FSK-converted data.

In the marketplace, there are available disks that constitute the composite information storage medium type of disc mentioned in one of the above identified patents. One example of such a product is the YAMAHA PIANOSOFT media products. That is to say, each of the musical works contained on such disks includes associated audio data codes and MIDI data codes. In fact, the MIDI data codes may be stored in an analog MIDI format. People who purchase this kind of composite information storage medium make use of the disc by putting it into the disc reading device of the modern player piano. Management for the musical works contained on such disks is performed by manually manipulating the discs.

There exists a need for the ability to access and manage musical works of the composite information type (i.e., works in which both audio data codes and MIDI data codes are provided) by using an interface that has friendly and efficient features such as those described in U.S. Pat. No. 5,864,868 or those present in the Apple iTunes software, and to play such works on a modern player piano in a convenient way.

SUMMARY OF THE INVENTION

The invention may be summarized, in one embodiment, as a system for playing music in which a user can operate a user interface to select media stored in a media database, and cause the music to be played at a player piano over a wireless link. The music stored in the media database has audio data and MIDI data for a given work. Both are provided to the player piano system. The player piano system has a sound producing system that outputs sound based on the audio data, and a system that actuates the piano keys based on the MIDI data. The user interface may, e.g., be a program such as APPLE ITUNES. The wireless link may, e.g., be facilitated by a device such as APPLE AIRPORT EXPRESS. The player piano may, e.g., be a YAMAHA DISKLAVIER.

The invention may be summarized, in another embodiment, as a system for playing music in which a user uses a user interface to load the aforementioned given musical work from the media database to a portable media playing device, and then connects the portable media playing device to the player piano. The portable media playing device outputs both the audio data and the MIDI data to the player piano. The player piano system has a sound producing system that outputs sound based on the audio data, and a system that actuates the piano keys based on the MIDI data. The user interface may, e.g., be a program such as APPLE ITUNES. The portable media playing device may, e.g., be an APPLE IPOD. The player piano may, e.g., be a YAMAHA DISKLAVIER.

Although the foregoing provides a good summary of the invention, various other embodiments will be mentioned below. The appended claims should be consulted to ascertain the complete scope of the invention.

The invention is taught below by way of various specific exemplary embodiments explained in detail, and illustrated in the enclosed drawing figures.

BRIEF DESCRIPTION OF THE DRAWINGS

The drawing figures depict, in highly simplified schematic form, embodiments reflecting the principles of the invention. Many items and details that will be readily understood by one familiar with this field have been omitted so as to avoid obscuring the invention. In the drawings.

DETAILED DESCRIPTION

The invention will now be taught using various exemplary embodiments. Although the embodiments are described in detail, it will be appreciated that the invention is not limited to just these embodiments, but has a scope that is significantly broader. The appended claims should be consulted to determine the true scope of the invention.

Figure 1:
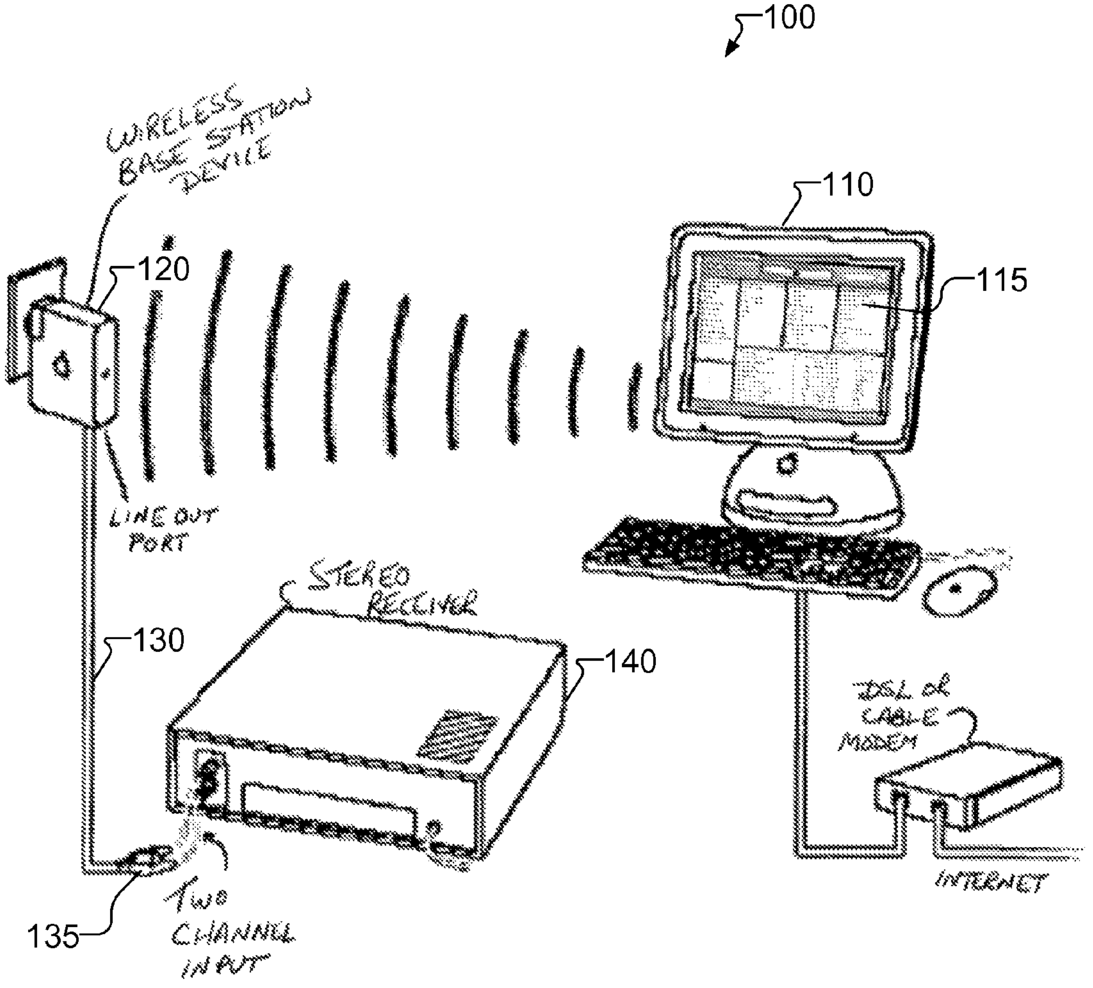
FIG. 1 PRIOR ART
FIG. 1 is a prior art drawing of the use of a personal computer with a wireless base station device and a stereo receiver.

Turning now to FIG. 1, reference 100 generally indicates a system for playing music on a stereo receiver. Personal computer 110 is a computer system equipped with software such as iTunes 115 or the like so as to provide a user interface for allowing a user access to media pieces stored in a media database. Reference 120 indicates a wireless base station device such as an Apple Airport Express device. The computer system 110 and the wireless base station device 120 are in wireless communication. The wireless base station device 120 includes a line out port and connects via cable 130 at an appropriate cable jack 135 to stereo receiver 140.

In this prior art system, the media pieces stored in the media database are in a digital audio format. With appropriate software such as the Apple Airtunes software, the Apple iTunes interface can be configured to send music data to the Apple Airport Express over the wireless connection. The Apple Airport Express wireless base station device 120 receives the audio data codes related to a musical work, in two channels. That is to say, the audio data codes are stored in association with a first channel and with a second channel. The line out port of the Apple Airport Express wireless base station device outputs the audio data codes in their respective two channels.

The cable 130 carries the signals of both channels to the output jack 135. The output jack is connected to the audio inputs of a stereo receiver 140.

When the iTunes software is requested to play a selected musical work, the iTunes software responds to such a request by sending the music data, including the audio data codes in both channels, to the Apple Airport Express wireless base station device. The wireless base station device passes on the two output channels via the cable to two respective audio inputs of the stereo receiver 140. The stereo receiver responds to the audio inputs by outputting audible sound.

It will be appreciated by those familiar with this field that the musical works stored in the media database can be loaded from a compact disc or the like, or downloaded through the Internet or other network connection.

Figure 2:
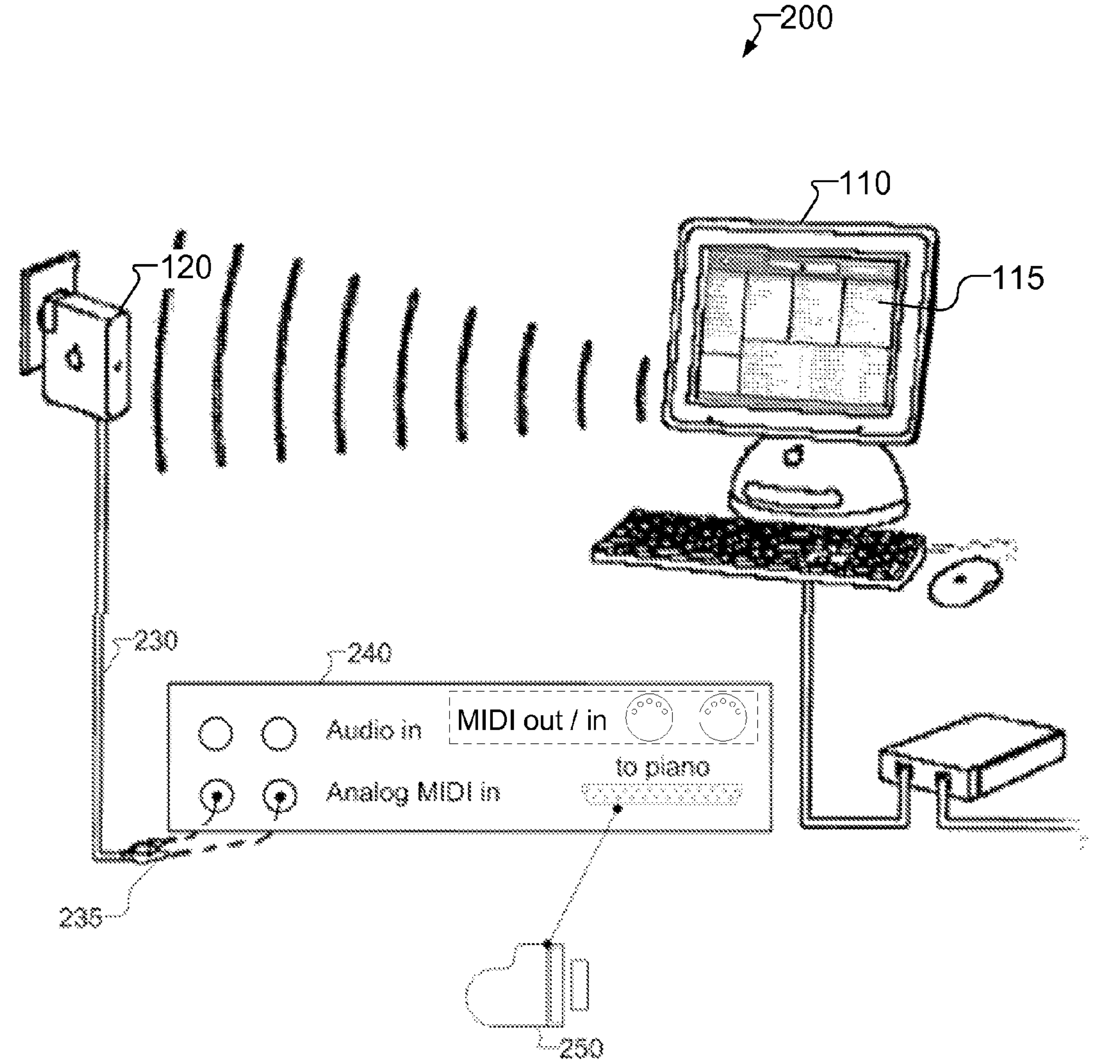
FIG. 2 shows one embodiment of the invention in which a personal computer connects to a control unit of a MIDI-enabled musical instrument system in a wireless manner.

Turning now to FIG. 2, there shown one embodiment according to the invention. In FIG. 2, reference 200 refers to a system for playing music. The computer system 110 stores a media database that includes recorded data from a composite information storage medium such as the YAMAHA PIANOSOFT media products. That is to say, each of the musical works contained on such disks includes associated audio data codes and MIDI data codes. The MIDI data codes are stored in an analog MIDI format. In other words, for each musical work, the music data is stored including audio data codes and MIDI data codes relating to the work, the audio data codes being stored in association with a first channel and the MIDI data codes being stored in association with a second channel.

This kind of music data of a musical work, which includes audio data codes and MIDI data codes that relate to the same work, may be thought of as a composite music data set. In this embodiment, the composite music data set includes MIDI data codes that are in the analog MIDI format. Also in this embodiment, the analog data codes are stored in association with a first channel and the MIDI data codes are stored in association with a second channel. In this arrangement, if one were to attempt to play the musical work using the iTunes interface, the result would not be pleasing to listen to because playing the channel with the MIDI data codes in analog MIDI format would sound like a fax machine or a computer modem.

When the iTunes software is requested to play such a composite music data set, it responds by sending the music data, including the audio data codes and the MIDI data codes, in their respective channels, to the Apple Airport Express wireless base station device using the wireless capability of the computer system and that of the Apple Airport Express device.

The Apple Airport Express wireless base station device has a line out port that provides a first output channel and a second output channel over a cable 230. The cable 230 can be the same as that cable 130 shown in FIG. 1. Likewise, a different kind of cable could be used if necessary. The cable 230 ends in an appropriate cable jack 235 such as an RCA jack. The cable jack 235 shown in FIG. 2 has two standard plugs that connect to control device 240. In particular, the plugs connect to the analog MIDI input ports of the control device 240.

Figure 3:
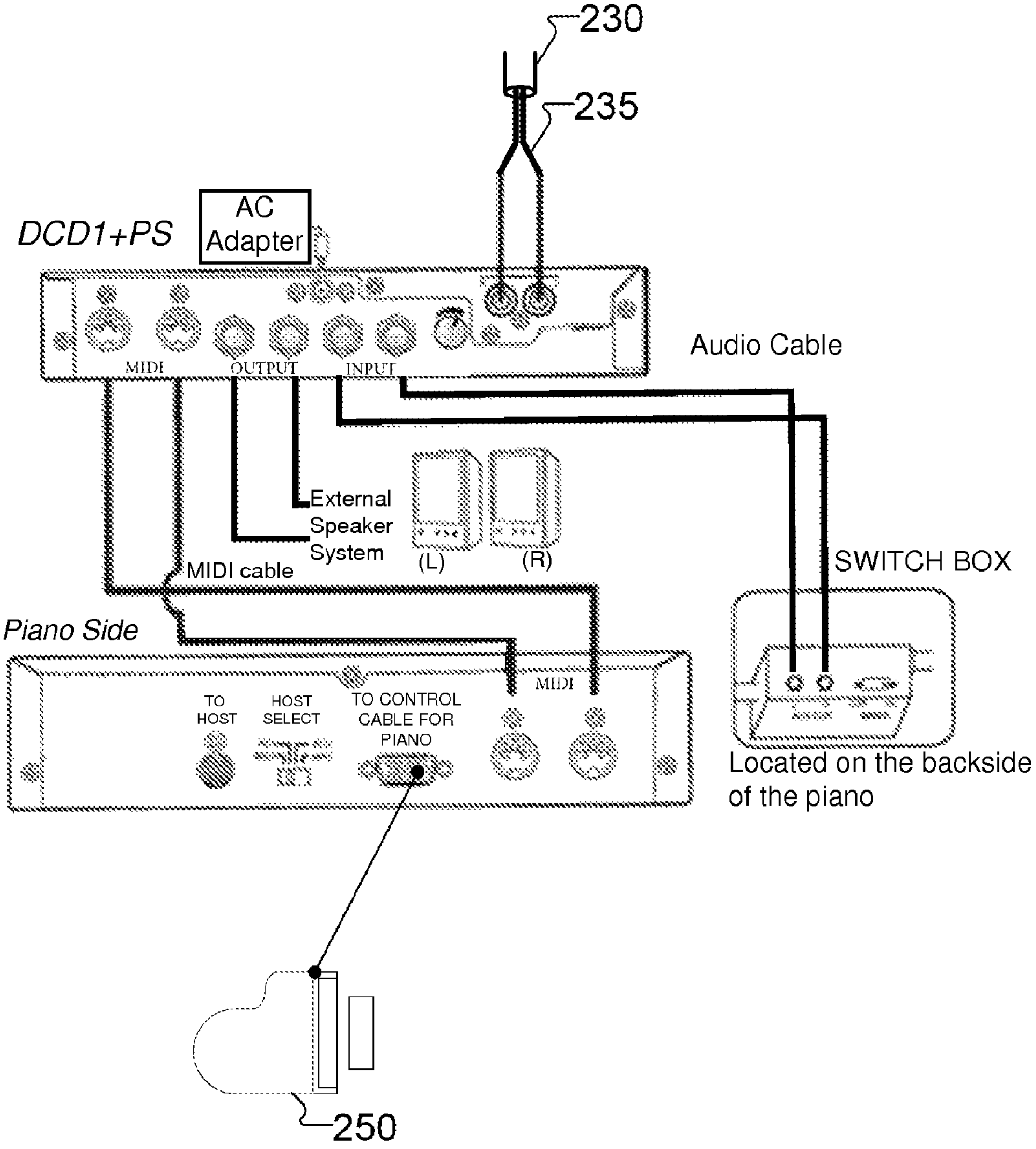
FIG. 3 shows one detail of the embodiment of the invention shown in FIG. 2.

The control device 240 is connected to a player piano 250 through an appropriate connection. There are many different control devices on the market. The control device can be one physical box or several physical boxes. FIG. 3 shows one concrete implementation of the control device 240 as three different physical boxes when used with certain models of the YAMAHA DISKLAVIER player piano. In this figure, the end of cable 230 is shown, and the connections between the jack 235 and the analog MIDI input ports are also shown. The three different boxes are cabled to each other and to the piano as shown in the diagram.

Returning now to FIG. 2, the Apple Airport Express device, which received the audio data codes from the composite music data set over a first channel, outputs the audio data codes of the first channel to one of the analog MIDI input ports of the piano control unit 240. The Apple Airport Express device, which received the MIDI data codes from the composite music data sent over a second channel, outputs the MIDI data codes of the second channel to the other one of the analog MIDI input ports of the piano control unit 240.

The piano control unit 240 decodes the analog MIDI input signal so as to extract from the signal the MIDI data codes. The MIDI data codes are output from the piano control unit to the automatic playing system of the player piano, so that the automatic playing system of the player piano responds to the MIDI data codes by sending actuation signals to the keyboard mechanism to make the keys of the piano move. The piano control unit 240 passes the audio data codes to a sound producing system (not shown in this figure; see FIG. 3, below) which responds to the audio data codes by outputting audible sound. Preferably, the MIDI data codes and the audio data codes include proper synchronization signals so that the actuation of the keys of the piano occurs at a proper timing with respect to the production of the audible sound from the sound producing system.

One advantage of this embodiment of the invention, among others, is that the musical works that are of the kind that have a composite music data set are managed with a friendly and easy to use interface 115 such as iTunes or some other user interface that allows a user to access media pieces stored in a media database. Instead of controlling the media library by shuffling compact discs in and out of, e.g., the control unit 240, the musical works are stored in a media library with other music and kept easy to access through a computer system 110 without the unnecessary bother and clutter of a lot of compact discs or the like. Furthermore, since there is a wireless connection between the computer system 110 and the wireless base station 120, it is not necessary to have a computer system in close proximity to a piano 250.

As will be appreciated by persons who are interested in this field, a player piano is not the only musical instrument that can be used to advantage in conjunction with this embodiment of the invention. Other MIDI capable musical instruments may be used, as long as a control unit can be provided with appropriate analog MIDI input ports. Of course, such other MIDI-enabled musical instruments might not have keyboard mechanisms, so they may be thought of as generally having an "instrument mechanism" appropriate to the type of instrument involved (e.g., a MIDI-enabled wind instrument might have a valve mechanism). Moreover, it is not essential that a musical work be obtained as a composite music data set. It is possible for the MIDI data codes, that correspond to a musical work, to be produced by the computer system 110 on an as-needed or as-desired basis. Such MIDI data codes can be converted to an analog MIDI format also on an as needed or as desired basis.

Figure 4:
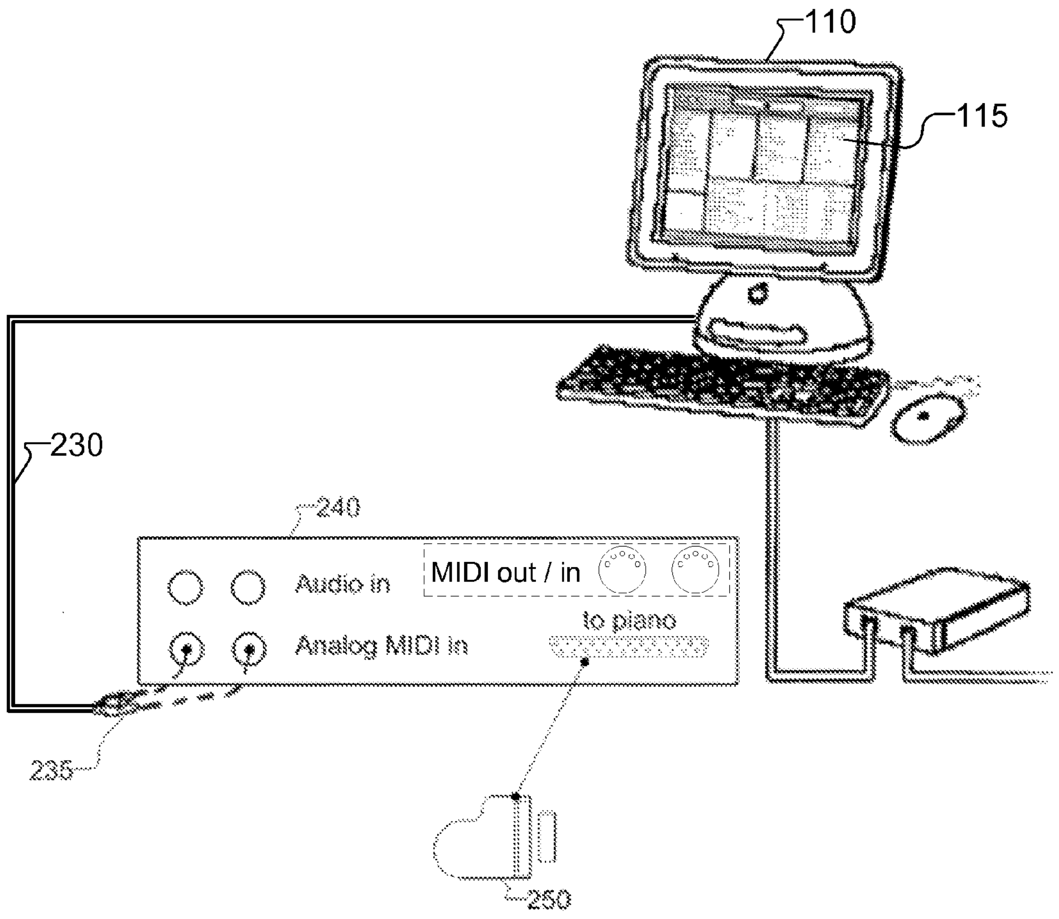
FIG. 4 shows another embodiment of the invention in which a personal computer connects to a control unit of a MIDI-enabled musical instrument system.

Furthermore, it is not essential that the connection between the computer system 110 and the control unit 240 be a wireless connection. FIG. 4 shows one variation of the invention in which the computer system 110 connects to the control unit 240 by a cable 230 that is connected to the line out jack of the computer system. This embodiment of the invention does not have the advantage of the wireless connection, but it does provide the other advantages of accessing and managing musical works having a composite data set with a friendly and effective user interface for allowing the user to access such media pieces stored in a media database.

Furthermore, it is not essential that the user interface be iTunes. Other user interfaces may be used with good effect.

Figure 5:
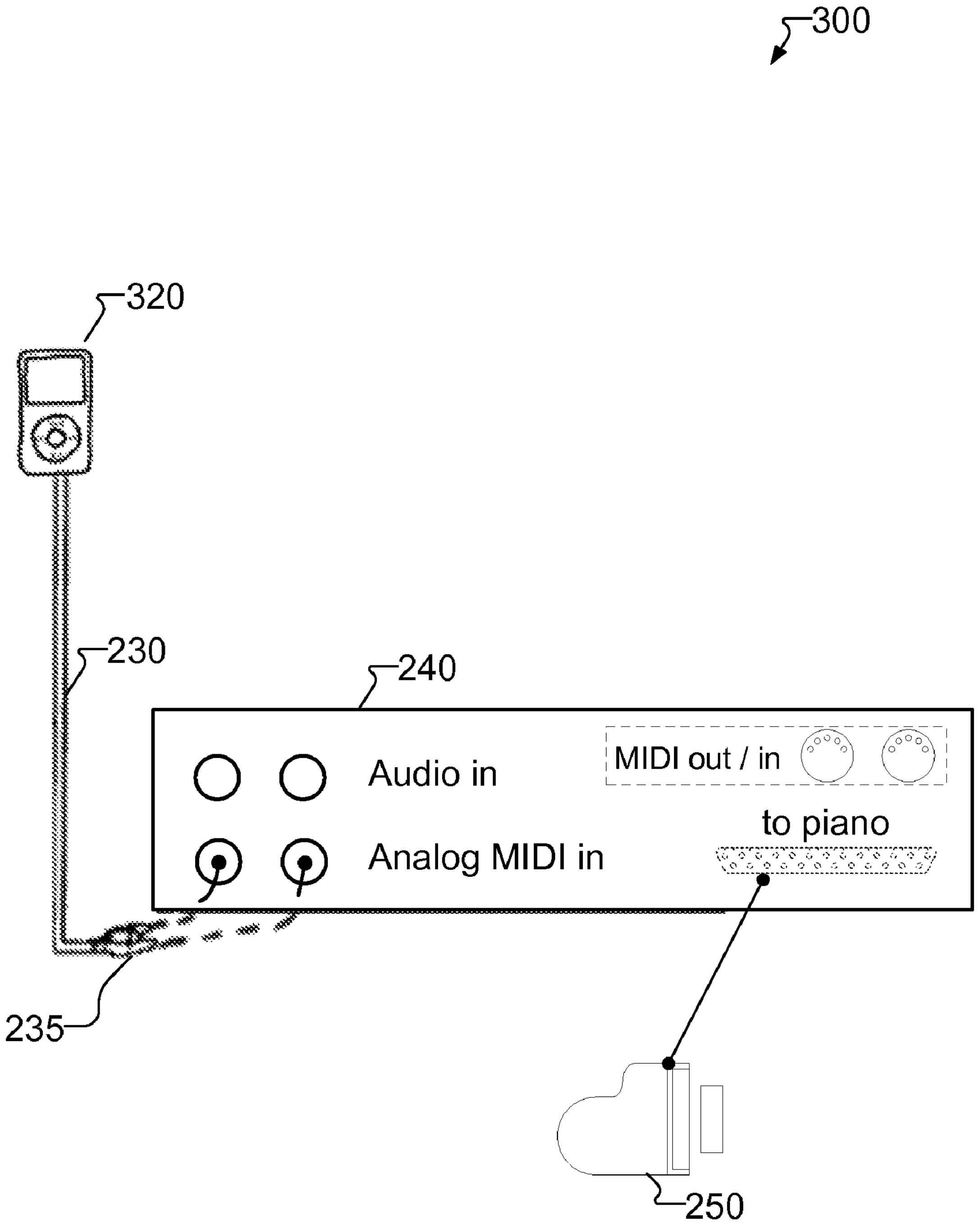
FIG. 5 shows yet another embodiment of the invention in which a portable music playing device connects to a control unit of a MIDI-enabled musical instrument system.

Furthermore, it is not essential that the user interface and be media database be used in connection with a personal computer system. Turning now to FIG. 5, there is shown as reference 300 and embodiment of the invention in which a system for playing music includes a portable music playing device 320 having a data storage and a line out port. Prior to the connection shown in FIG. 5, the portable music playing device 320 has been loaded with a musical work that has a composite music data set from computer system 110. The portable music playing device 320 has a line out port that outputs in two channels. The two channels from the line out port of the portable music playing device 320 are connected to the analog MIDI input ports of the control unit 240. Except for the replacement of the computer system 110 with the portable music playing device 320, the operation of the system 300 is substantially the same, in respects that will be clear to the interested reader, as system acquisition system 200 described previously. The portable music playing device 320 is preferably an Apple iPod, but other types of portable music playing device 320 will work. The Apple iPod is preferred because it is convenient to use when the user interface 115 of computer system 110 is Apple iTunes.

Figure 6:
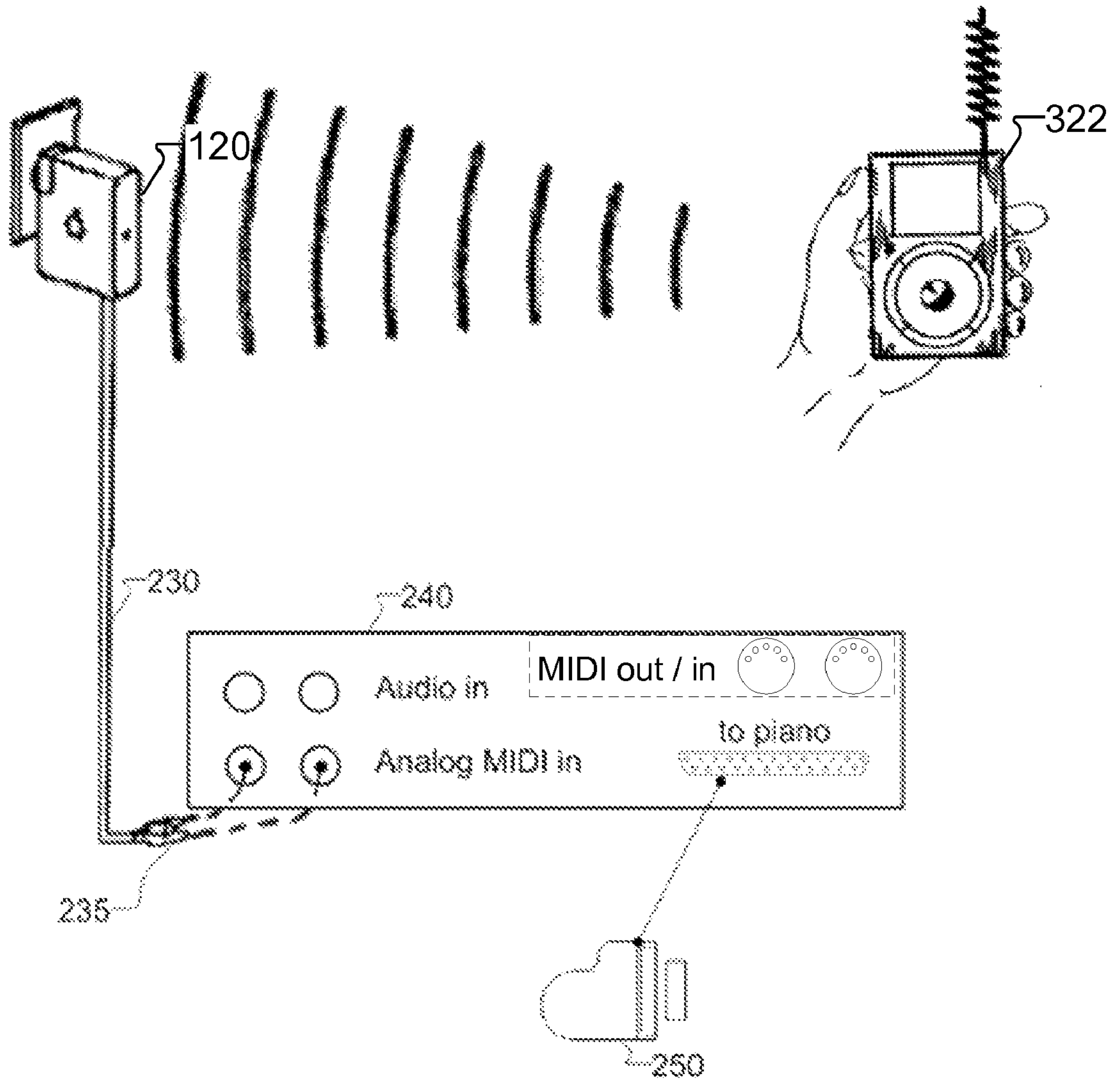
FIG. 6 shows yet another embodiment of the invention in which a portable music playing device connects to a control unit of a MIDI-enabled musical instrument system in a wireless manner.

Although FIG. 5 shows the portable music playing device 320 connected directly to the control unit 240, it is possible to use the portable music playing device 320 in place of the computer system 110 as described earlier with respect to FIG. 2. Such an alternative embodiment is shown in FIG. 6, in which portable music playing device with wireless capability 322 communicates wirelessly with wireless base station device 120. Signals received from portable music playing device with wireless capability 322 are provided to control unit 240 by means of a cable 230 that connects from the line out port of wireless base station device 120 to the analog MIDI input ports of control unit 240 at jack 235. As a portable music playing device with wireless capability 322, a wireless Apple iPod is preferred because it is convenient to use when the user interface 115 of computer system 110 is Apple iTunes. Other types of portable music playing device with wireless capability 322 may be used. For example, there are many types of handheld computing devices such as a HEWLETT PACKARD IPAQ pocket PC that have built-in wireless LAN capability or can be upgraded to have such a capability. Such a device can communicate with wireless base station device 120 and send to the control unit 240 appropriate audio and MIDI data codes.

Many additional variations to the above-identified embodiments are possible without departing from the scope and spirit of the invention. Possible variations have been presented throughout the foregoing discussion. Moreover, it will be appreciated that other approaches to sending the audio data codes and the MIDI data codes to the control unit 240 are possible. That is to say, in the above discussion, it has been understood that the audio data codes are passed along one channel and the MIDI data codes are passed along another channel. This has been used for the sake of a simple explanation. It is of course possible and may be preferable that the analog MIDI format information be passed to control unit 240 in other ways such as by overlapping such data with the audio data codes at frequencies easily separable from the important audio data code information. In this manner, audio data codes can be passed along both channels to control unit 240, and so can the MIDI data codes. Such a separation will still be understood to constitute different "channels" as the term is used herein. That is to say, the MIDI data codes define a MIDI channel, and the audio data codes define an audio channel, no matter what particular signaling technique may be used to pass the signals from the computer system 110 or portable music playing device 320 or portable music playing device with wireless capability 322 to the control unit 240, with or without the wireless base station device 120 being used.

Furthermore, although the various embodiments of the invention have been described in connection with a musical work that has a composite music data set, it will be appreciated that the sending of audio data codes is not necessarily an essential aspect of the invention. That is to say, one alternative is that only MIDI data codes are included in the musical work. There are many MIDI-only compositions available that may be of interest to play. In this situation, the above-identified embodiments of the invention will operate in the same manner, except that no audio data codes will be sent, and the sound reproducing system of the MIDI-enabled musical instrument will not function in response to audio data codes.

Combinations and subcombinations of the various embodiments described above will occur to those familiar with this field, without departing from the scope and spirit of the invention.

There is claimed:

1. A system for playing music, comprising:

a computer system having a user interface for allowing a user access to media pieces stored in a media database, and a wireless LAN capability;

a wireless base station device with a line out port;

a MIDI-enabled musical instrument system, having a control system with analog MIDI inputs, an automatic playing system, an instrument mechanism, and a sound producing system, the automatic playing system being operable to send actuation signals to the instrument mechanism;

the media database of the computer system storing music data of at least one musical work, including audio data codes and MIDI data codes relating to the work, the audio data codes being stored in association with a first channel and the MIDI data codes being stored in association with a second channel;

the computer system communicating with the wireless base station device using the wireless LAN capability;

the line out port of the wireless base station device providing a first and second output channels;

the first and second output channels of the wireless base station device being connected to the analog MIDI inputs of the control system;

the user interface, for allowing user access to the media pieces stored in the media database, being configured to send music data to the wireless base station device;

wherein:

the user interface responds to a request to play the music data of the at least one musical work by sending the music data, including the audio data codes and the MIDI data codes, to the wireless base station device;

the wireless base station device outputs the audio data codes from the first output channel and the MIDI data codes from the second output channel to the analog MIDI inputs of the control system;

the control system provides the MIDI data codes to the automatic playing system of the MIDI-enabled musical instrument;

the control system provides the audio data codes to the sound producing system of the MIDI-enabled musical instrument system to output audible sound;

the automatic playing system of the MIDI-enabled musical instrument responds to the MIDI data codes by sending actuation signals to the instrument mechanism;

the user interface is a hierarchically ordered graphical user interface capable of allowing a user to submit the request to play the music data of the at least one musical work.

2. The system as set forth in claim 1, further comprising a music data distribution system, wherein the music data of at least one musical work, including audio data codes and MIDI data codes relating to the work, is downloaded from the music data distribution system and stored on the computer system.

3. The system as set forth in claim 1, wherein the MIDI-enabled musical instrument system is a player piano, and wherein the instrument mechanism responds to the actuation signals by moving keys of the player piano.

4. A system for playing music, comprising:

a portable media playing device with an output port, a media database, and a user interface adapted to allow a user access to media pieces stored in the media database;

a MIDI-enabled musical instrument system, having a control system with analog MIDI inputs, an automatic playing system, and a sound producing system;

the media database storing a plurality of the media pieces, including of at least one musical work stored as music data of a composite information type including audio data codes and MIDI data codes relating to the work, the audio data codes being stored in association with a first channel and the MIDI data codes being stored in association with a second channel;

the output port of the portable media playing device providing first and second output channels connected to the analog MIDI inputs of the control system;

wherein:

the user interface responds to a request to play the music data of the at least one musical work by sending the music data, including the audio data codes and the MIDI data codes, to the output port;

the audio data codes from the first output channel and the MIDI data codes from the second output channel are communicated to the analog MIDI inputs of the control system;

the control system provides the MIDI data codes to the automatic playing system of the MIDI-enabled musical instrument;

the control system provides the audio data codes to the sound producing system of the MIDI-enabled musical instrument system;

the portable media playing device is a pocket-sized multimedia device that stores the media database and the plurality of media pieces; and the user interface is a hierarchically ordered graphical user interface capable of allowing a user to submit the request to play the music data of the at least one musical work.

5. The system as set forth in claim 4, wherein the audio data codes are communicated from the portable media playing device to the MIDI-enabled musical instrument system over a cable connected to a line out port of the portable media playing device.

6. The system as set forth in claim 4, wherein the audio data codes are communicated from the portable media playing device to the MIDI-enabled musical instrument system over a wireless link.

7. The system as set forth in claim 6, wherein the wireless link carries the audio data codes from the portable media playing device to a wireless base station device with a line out port, and wherein the audio data codes are communicated from the wireless base station device to the MIDI-enabled musical instrument system over a cable connected to the line out port of the wireless base station device.

8. The system as set forth in claim 4, further comprising a music data distribution system, wherein the at least one musical work stored as music data of a composite information type is downloaded from the music data distribution system.

9. The system as set forth in claim 4, wherein the MIDI-enabled musical instrument system is a player piano that responds to the MIDI data codes by moving keys of the player piano.

10. A system for playing music, comprising:

a processor-controlled media playing device with an output port, a media database, and a user interface adapted to allow a user access to media pieces stored in the media database, the user interface being a hierarchically ordered graphical user interface;

a MIDI-enabled musical instrument system, having a control system with an analog MIDI input, and an automatic playing system;

the media database storing a plurality of the media pieces, including of at least one musical work stored as analog data codes and analog MIDI data codes relating to the work;

the output of the output port of the processor controlled media playing device being provided to the analog MIDI input of the control system;

wherein:

the user interface responds to a request to play the music data of the at least one musical work by sending the audio data codes and the MIDI data codes, to the output port;

the analog data codes and the MIDI data codes are communicated to the analog MIDI input of the control system;

the control system provides the MIDI data codes to the automatic playing system of the MIDI-enabled musical instrument; and the automatic playing system operates automatically in response to the MIDI data codes.

11. The system as set forth in claim 10, wherein the processor-controlled media playing device is a portable media playing device, and the portable media playing device is a pocket-sized multimedia device that stores the media database and the plurality of media pieces.

12. The system as set forth in claim 10, wherein the processor-controlled media playing device is a computer system.

* * * * *